(12) United States Patent
Lyubina

(10) Patent No.: US 11,312,633 B2
(45) Date of Patent: Apr. 26, 2022

(54) SILICON-CARBON COMPOSITE POWDER

(71) Applicant: Evonik Operations GmbH, Essen (DE)

(72) Inventor: Julia Lyubina, Hanau (DE)

(73) Assignee: Evonik Operations GmbH, Essen (DE)

( * ) Notice: Subject to any disclaimer, the term of this patent is extended or adjusted under 35 U.S.C. 154(b) by 0 days.

(21) Appl. No.: 16/032,683

(22) Filed: Jul. 11, 2018

(65) Prior Publication Data

US 2019/0016601 A1 Jan. 17, 2019

(30) Foreign Application Priority Data

Jul. 12, 2017 (EP) .................................... 17181002

(51) Int. Cl.
*C01B 33/035* (2006.01)
*H01M 4/134* (2010.01)
(Continued)

(52) U.S. Cl.
CPC ............ *C01B 32/956* (2017.08); *B82Y 40/00* (2013.01); *H01M 4/0428* (2013.01); *H01M 4/133* (2013.01); *H01M 4/134* (2013.01); *H01M 4/1393* (2013.01); *H01M 4/1395* (2013.01); *H01M 4/364* (2013.01); *H01M 4/386* (2013.01); *H01M 4/587* (2013.01)

(58) Field of Classification Search
None
See application file for complete search history.

(56) References Cited

U.S. PATENT DOCUMENTS

| 6,444,568 B1 | 9/2002 | Sundararajan et al. |
| 2002/0027286 A1 | 3/2002 | Sundararajan et al. |

(Continued)

FOREIGN PATENT DOCUMENTS

| CN | 103170315 A | 6/2013 |
| CN | 103378368 A | 10/2013 |

(Continued)

OTHER PUBLICATIONS

U.S. Appl. No. 16/065,194, filed Dec. 22, 2016.
(Continued)

*Primary Examiner* — Ronak C Patel
(74) *Attorney, Agent, or Firm* — Oblon, McClelland, Maier & Neustadt, L.L.P.

(57) ABSTRACT

A silicon-carbon composite powder having Si and C distributed throughout each particle is provided. The weight ratio of carbon to silicon on the surface of a particle $(C/Si)_{surface}$ is greater than the weight ratio of carbon to silicon within the total particle $(C/Si)_{total}$. The silicon-carbon composite powder is produced by simultaneously feeding into a reactor a gaseous stream of a $SiH_4$, $Si_2H_6$, $Si_3H_8$ and/or organosilane and a gaseous stream of at least one hydrocarbon of ethylene, ethane, propane and acetylene and reacting the streams using plasma enhanced chemical vapor deposition.

10 Claims, 2 Drawing Sheets

(51) Int. Cl.
    *H01M 4/133*     (2010.01)
    *H01M 4/36*     (2006.01)
    *H01M 4/04*     (2006.01)
    *C01B 32/956*     (2017.01)
    *H01M 4/587*     (2010.01)
    *H01M 4/1395*     (2010.01)
    *H01M 4/38*     (2006.01)
    *B82Y 40/00*     (2011.01)
    *H01M 4/1393*     (2010.01)

(56) References Cited

U.S. PATENT DOCUMENTS

| | | | |
|---|---|---|---|
| 2012/0107693 | A1 | 5/2012 | Ishida et al. |
| 2012/0121982 | A1 | 5/2012 | Harimoto et al. |
| 2014/0079997 | A1 | 3/2014 | Rosso et al. |
| 2014/0287317 | A1* | 9/2014 | Tiquet ............... C01B 33/02 429/231.8 |
| 2014/0302396 | A1* | 10/2014 | Lu ................... H01M 4/386 429/231.8 |
| 2015/0155562 | A1* | 6/2015 | Ha .................... H01M 4/62 429/231.8 |
| 2016/0359162 | A1* | 12/2016 | Kim ................. H01M 4/134 |

FOREIGN PATENT DOCUMENTS

| | | |
|---|---|---|
| CN | 103455326 A | 12/2013 |
| JP | 2007-188873 A | 7/2007 |

OTHER PUBLICATIONS

U.S. Appl. No. 14/950,787, filed Jun. 2, 2016, 2016/0155871.
U.S. Appl. No. 16/078,359, filed Aug. 21, 2018.
Extended European Search Report dated Sep. 25, 2017 in Patent Application No. 17181002.1.
Y.H. Wang, et al., "Multiphase structure of hydrogenated amorphous silicon carbide thin films", Materials Science and Engineering B95, XP004370675, 2002, pp. 43-50.
K. Sel, et al., "Effects of tail states on the conduction mechanisms in silicon carbide thin films with high carbon content", Solid-State Electronics, vol. 57, XP028364877, 2011, pp. 1-8.
Office Action dated Nov. 8, 2021, in Japanese Patent Application No. 2018-132563 (with English machine translation).
Office Action and Search Report dated Dec. 16, 2021, in Taiwanese Patent Application No. 107123637.
Office Action and Search Report dated Jan. 6, 2022, in Chinese Patent Application No. 201610757271.X (with English translation).

\* cited by examiner

SILICON-CARBON COMPOSITE POWDER

CROSS REFERENCE TO RELATED APPLICATION

This application claims the benefit of European patent application EP 17181002.1 filed on Jul. 12, 2017, the entire disclosure of which is incorporated herein by reference.

FIELD OF INVENTION

The invention relates to silicon-carbon composite powder, a process for its manufacture and its use for lithium ion batteries.

BACKGROUND

It is known that the large volume expansion/contraction during the alloying/dealloying of lithium, results in the formation of cracks followed by pulverization of the active mass particles and permanent capacity loss in lithium ion batteries.

To overcome the large volume change and thus obtain better capacity retention and cycle life for Si anodes, various approaches have been used. Among them, the most promising approach is to create a nanocomposite structure in which nanosized Si particles are surrounded by an active shell, preferably a carbon shell.

Furthermore, the crack formation due to the large volume change experienced by the Si-based anodes during cycling results in the exposure of the electrode surface to the electrolyte. This leads to a continuous formation of thick solid electrolyte interface (SEI) layers. The excessive growth of SEI causes low Coulombic efficiency, higher resistance to ionic transport and low electronic conductivity of the electrode and eventually results in the dry-out of the cell. Composite materials in which nanosized Si particles are surrounded by a carbon shell were proved to be advantageous also for inhibiting the SEI formation [Dimitrijevic et al., J. Power Sources 206 (2012) 343].

Various methods have been employed for preparing silicon-carbon composite material. Methods comprise ball milling or mechanical milling, pyrolysis, chemical/thermal vapor deposition and chemical reaction of gels.

In WO2013078645A1 a silicon-carbon composite is claimed, comprising mesoporous silicon particles and carbon coating provided on the silicon particles, wherein the silicon particles have two pore size distributions of 2-4 nm and 20-40 nm. The thickness of the carbon coating is 5-10 nm and the carbon is contained in an amount of 10 to 50% by weight, based on the total weight of the composite. Also claimed is a process of preparing a the silicon-carbon composite, comprising the steps of preparing mesoporous silicon particles via a mechanochemical reaction between $SiCl_4$ and $Li_{13}Si_4$ under ball milling and subsequent thermal treatment and washing process; and coating the mesoporous silicon particles with carbon using chemical vapor deposition.

Ng et al. disclose in Angew. Chem., Int. Ed. 2006, 45, 6896 a carbon-coated Si nanocomposite using a spray pyrolysis process at 400° C. in air. The carbon in this nanocomposite most likely is of amorphous nature. The major part of the silicon corresponds to nanocrystalline Si, although minor amounts of amorphous silicon are likely. The silicon is surrounded by an amorphous or partially amorphous carbon layer of ca. 10 nm in thickness.

Ng et al. further disclose in J. Phys. Chem. C 2007, 111, 11131 a low temperature spray pyrolysis to produce Si nanocomposites as anode materials in rechargeable lithium-ion batteries. The nanosized Si particles, <100 nm, were further spray-pyrolyzed in a citric acid/ethanol solution, resulting in a homogeneous layer of carbon coating on the surface of the spheroidal Si nanoparticles.

Yang et al. disclose in Electrochemistry Communications 28 (2013) 40 composites containing Si embedded in a carbon matrix. The silicon-carbon nanocomposite powders are prepared by spray pyrolysis. An aerosol comprising an active organosilane, forming both, Si and C, in the later nanocomposite, is reacted in a tubular furnace at 900° C. The weight fraction of Si is estimated to be 40%. Importantly, the method yields uniformly sized particles in which the carbon and amorphous Si are well distributed.

Zhang et al. report in Nanoscale, 2013, 5, 5384 the preparation of amorphous silicon-carbon nanospheres as anode materials in Li-ion batteries. These nanospheres were synthesized by a chemical vapor deposition at 900° C. using methyltrichlorosilane ($CH_3SiCl_3$) as both the Si and C precursor. It was found that the Si—C nanospheres were composed of about 60 wt. % of amorphous C and about 40 wt. % Si with a diameter of 400-600 nm and a surface area of 43.8 $m^2/g$.

Sorice et al. report in ACS Appl. Mater. Interfaces 2015, 7, 6637 on the formation of carbon-covered silicon nanoparticles by a one-step continuous process in a two stages laser pyrolysis reactor. Crystallized silicon cores formed in a first stage were covered in the second stage by a continuous shell mainly consisting of carbon. At the Si/C interface silicon carbide is absent. In the first stage, the laser beam interacts with a $SiH_4$ flow resulting in the synthesis of silicon nanoparticles. The Ar carrier gas flow transfers them to the second stage where ethylene ($C_2H_4$) is inserted coaxially. The laser beam is transported by two mirrors to the second stage and defocalized in order to maximize the time of interaction between the $C_2H_4$ flow and the silicon cores. This second interaction results in the deposition of a carbon shell around the small agglomerates of silicon nanoparticles. The diameter of silicon nanoparticles was adjusted around 30 nm. The laser power and focalization was adjusted to favor a crystalline structure of the silicon cores.

Yu et al. report in Ind. Eng. Chem. Res. 2014, 53, 12697 of the formation of a uniform carbon coating on crystalline Si nanoparticles by the dynamic chemical vapor deposition (CVD) process with toluene or acetylene as the carbon source.

Chaukulkar et al. report in ACS Appl. Mater. Interfaces 2014, 6, 19026 on a plasma synthesis of carbon-coated silicon nanoparticles. In a tubular quartz reactor, $SiH_4$ was injected upstream at an rf power of 50 W. $C_2H_2$ was injected into the quartz tube downstream from the $SiH_4$ injection point.

Although all these methods provide better cycling performance for the silicon-carbon composite anodes compared to that of pure Si anodes, capacity fading still needs improvement.

It has been reported that crystalline $Li_xSi$ (x≥3.75) forms during the lithiation of silicon when the voltage becomes less than 50 mV. The transformation to the $Li_xSi$ (x≥3.75) phase upon lithiation results in high internal stresses, leading to particle fracture and cell fade, as reported by Iaboni and Obrovac in J. Electrochemical Soc. 2016, 163, A255.

One of the methods to prohibit the formation of $Li_xSi$ (x≥3.75) is to restrict the cycling voltage of the Si-containing electrode to above 50 mV. This, however, results in significantly reduced cell energy density. In addition to having a lower energy density, limiting the voltage of the Si-containing electrode may not be practical, because high density alloy electrodes are likely to be blended with graphite or other forms of carbon. In such electrodes, the alloy phase must be cycled to low voltages, so that the graphite or carbon is active. It is, therefore, desirable to prohibit the formation of $Li_xSi$ ($x\geq3.75$) without limiting the voltage.

The suppression of the $Li_xSi$ ($x\geq3.75$) formation can be realized in particles comprising an active Si phase and an inactive matrix phase, such as found in Si-containing alloys and $Si/SiO_x$ ($x\leq2$) composites. However, the inactive phase reduces the specific capacity of the material and is therefore undesirable.

SUMMARY OF THE INVENTION

The subject matter of the present invention is a silicon-carbon composite powder, in which
  a) Si and C are distributed throughout the particle and
  b) the ratio by weight of $(C/Si)_{surface}$ on the surface of a particle is greater than the ratio by weight of $(C/Si)_{total}$ within the total particle.

DETAILED DESCRIPTION OF THE INVENTION

Figure 1:
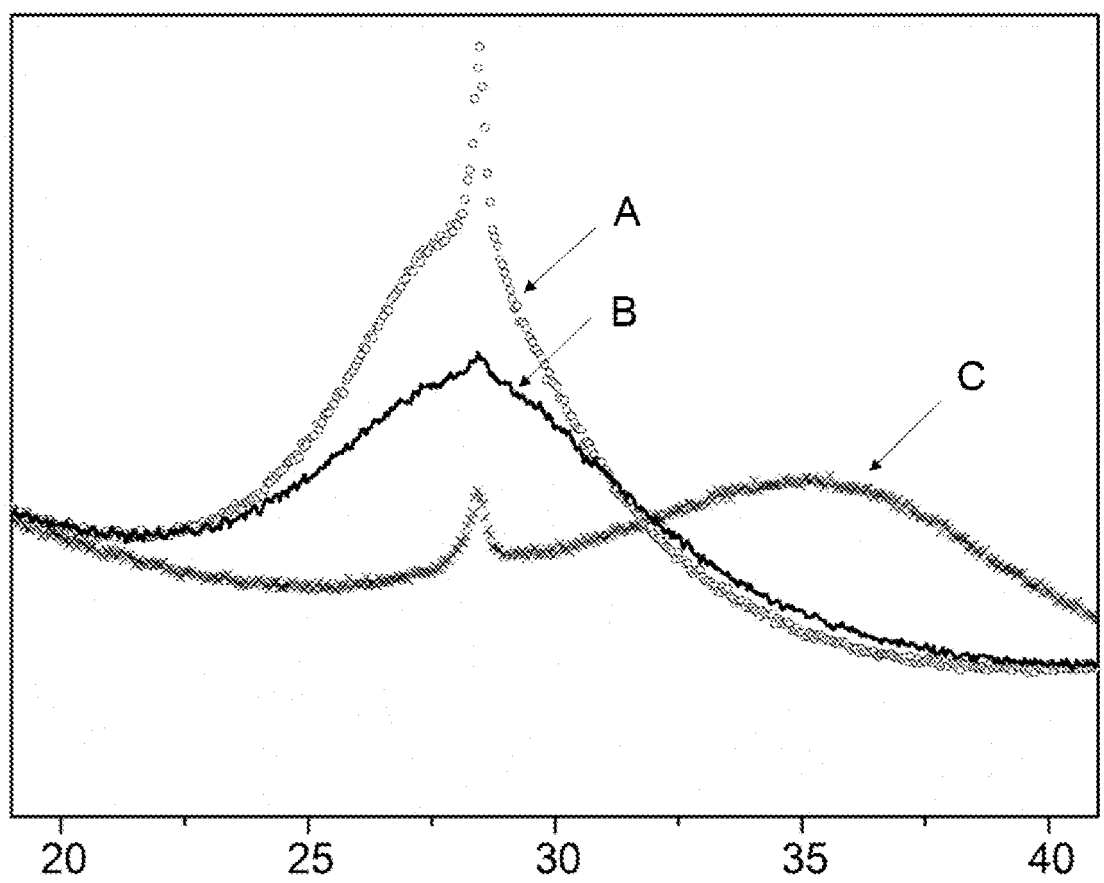
FIG. 1 shows the x-ray diffraction (XRD) patterns of the silicon powder in comparative Example 5 (A), the inventive silicon-carbon composite powder (B), and the powder in comparative Example 6 (C).

In this silicon-carbon composite powder, the formation of $Li_xSi$ ($x\geq3.75$) is suppressed as evidenced by voltage versus capacity measurements. Moreover, the higher C content at the surface of this silicon-carbon composite powder is advantageous in terms of prohibiting the excessive SEI growth.

The inventive silicon-carbon composite powder has the surprising property that it does not exhibit a core shell structure which can be detected by transmission electron microscope (TEM).

The ratio by weight of $(C/Si)_{surface}$ on the surface of a particle and the ratio by weight of $(C/Si)_{total}$ both are determined by energy dispersive x-ray analysis (EDX) in a transmission electron microscope (TEM).

In a preferred embodiment the ratio $(C/Si)_{surface}/(C/Si)_{total}$ counts for $3\leq(C/Si)_{surface}/(C/Si)_{total}\leq130$. In another preferred embodiment the ratio $(C/Si)_{surface}/(C/Si)_{total}$ counts for $10\leq(C/Si)_{surface}/(C/Si)_{total}\leq50$.

The ratio by weight of $(C/Si)_{total}$ preferably is $0.01\leq(C/Si)_{total}\leq3$, more preferably $0.3\leq(C/Si)_{total}\leq1$.

In contrast to the prior art in the present inventive powder Si and C are distributed throughout the particle. No core shell structure could be detected by transmission electron microscope (TEM). In addition no silicon carbide can be detected in the inventive powder.

Si and C of the inventive powder may be crystalline or amorphous. For its later use as a part of a lithium ion battery it is preferred that Si and C are amorphous.

The particles of the inventive powder may be in an isolated or in an aggregated form. Preferably the average particle diameter is 300 nm or below, more preferably it is 20-100 nm.

The invention further provides a process for the manufacture of the silicon-carbon composite powder in which a gaseous stream of a $SiH_4$, $Si_2H_6$, $Si_3H_8$ and/or organosilane and a gaseous stream of at least one hydrocarbon selected from the group consisting of ethylene, ethane, propane and acetylene are simultaneously fed into a reactor wherein the streams are reacted using plasma enhanced chemical vapor deposition.

The ratio of hydrocarbon to $SiH_4$ and/or organosilane may be selected over a wide range. Preferably the ratio is 0.01-3.

The organosilane may be selected from the group consisting of $CH_3SiH_3$, $(CH_3)_2SiH_2$, $(CH_3)_3SiH$, $C_2H_5SiH_3$, $(C_2H_5)_2SiH_2$, $(C_2H_5)_3SiH$, $(CH_3)_4Si$, $(C_2H_5)_4Si$, $C_3H_7SiH_3$, $(C_3H_7)_4Si$, $C_4H_9SiH_3$, $(C_4H_9)_2SiH_2$, $(C_4H_9)_3SiH$, $(C_4H_9)_4Si$, $C_5H_{11}SiH_3$, $(C_5H_{11})_2SiH_2$, $(C_5H_{11})_3SiH$, $(C_5H_{11})_4Si$, $C_6H_{13}SiH_3$, $(C_6H_{13})_4Si$, $(C_7H_{15})SiH_3$, $(C_7H_{15})_2SiH_2$, $(C_7H_{15})_3SiH$, $(C_7H_{15})_4Si$.

$CH_3SiH_3$, $(CH_3)_2SiH_2$ and $(CH_3)_3SiH$ are most preferred.

Ethylene, ethane and propane are the preferred hydrocarbons. Acetylene is a more reactive starting material and care has to be taken to avoid the formation of SiC. That is to say, either using low concentrations of acetylene or varying the setup for the plasma enhanced chemical vapor deposition.

The average residence time of the reaction mixture comprising the silane and the hydrocarbon may be used to influence the average particle average diameter. Reducing the residence time in the plasma usually reduces the particle diameter. Thus a residence time of 4 s yields an average particle size of 300 nm, a shorter residence time of 1 s results in an average particle size of below 100 nm.

Using residence time of 0.5 s results in obtaining a powder with a particle average diameter below 50 nm.

A further subject of the invention is the use of the silicon-carbon composite powder for the manufacture of lithium ion batteries.

Having generally described the invention, a further understanding can be obtained by reference to certain specific examples provided herein for purposes of illustrations only and are not intended to be limiting.

EXAMPLES

Example 1 (According to the Invention)

A radio frequency (RF) non-thermal plasma was applied to the chemical vapour deposition (CVD) method to produce powder materials. The setup consists of a RF plasma source, tubular quartz reactor, pump, process gas inlets, gas exhaust and powder collection chamber. A quartz tube reactor is evacuated to a base pressure of 10-100 mbar. The plasma source frequency is 13.56 MHz and the RF power is set at 50-200 W. $SiH_4$ and ethylene diluted in Ar are injected simultaneously via mass flow controllers. The concentration of silane in the gas mixture is 20 vol. %. The ratio $CH_x/SiH_4$ is 0.16. The gas flow rate and pressure are used to adjust the residence time in the plasma.

Longer residence time of 4 s results in obtaining a powder with particle average diameter below 300 nm. Shorter residence time of 1 s results in obtaining a powder with particle average diameter below 100 nm. Using residence time of 0.5 s results in obtaining a powder primary particle average diameter below 50 nm.

In the obtained silicon-carbon composite powder Si and C is distributed throughout the particle. The ratio by weight of $(C/Si)_{surface}$ on the surface of a particle is 3.5 and the ratio by weight of $(C/Si)_{total}$ within the total particle is 1.0 as determined by energy dispersive x-ray analysis (EDX) in a transmission electron microscope (TEM). The ratio $(C/Si)_{surface}/(C/Si)_{total}$ in the silicon-carbon composite powder is 3.5.

Examples 2-4: Further embodiments are carried out using the conditions described in Example 1. In contrast to Example 1, in examples 2-4 the type of the carbon precursor gas $CH_x$ was varied according to the Table. The variation of the silicon-carbon composite powder parameters is given in the Table.

Example 5 (comparison): Further embodiment is carried out using the conditions described in Example 1. In contrast to Example 1, only $SiH_4$ is introduced into the quartz tube reactor. No carbon precursor gas is used. The obtained powder contains silicon only. The ratio by weight of $(C/Si)_{surface}$ on the surface of a particle and the ratio by weight of $(C/Si)_{total}$ within the total particle is hereby zero.

This difference between the silicon powder in Example 5 and the silicon-carbon composite powder in Examples 1-4 is also apparent in x-ray diffraction (XRD) patterns shown in FIG. 1 (x-axis=2θ (degrees); y-axis=intensity(a.u.)). The XRD pattern of the silicon powder produced in Example 5 (A) is characterized by a sharper peak near 28.4° due to nanocrystalline Si and a broader peak (amorphous halo) due to amorphous Si. According to the quantitative phase analysis, the amount of the crystalline silicon is 20 vol. %.

The intensity of the amorphous halo in the XRD pattern of the silicon-carbon composite powder (B) is reduced and slightly shifted to higher diffraction angles compared to the silicon powder (A). A sharper peak near 28.4° is due to nanocrystalline Si, which is present in the amount of 4 vol. % in the silicon-carbon composite powder (B). The reduction of the amorphous halo intensity and halo shift indicate the formation of the silicon-carbon composite powder with Si and C distributed throughout the particle, i.e. the amorphous halo arises from Si and C mixture.

Figure 2:
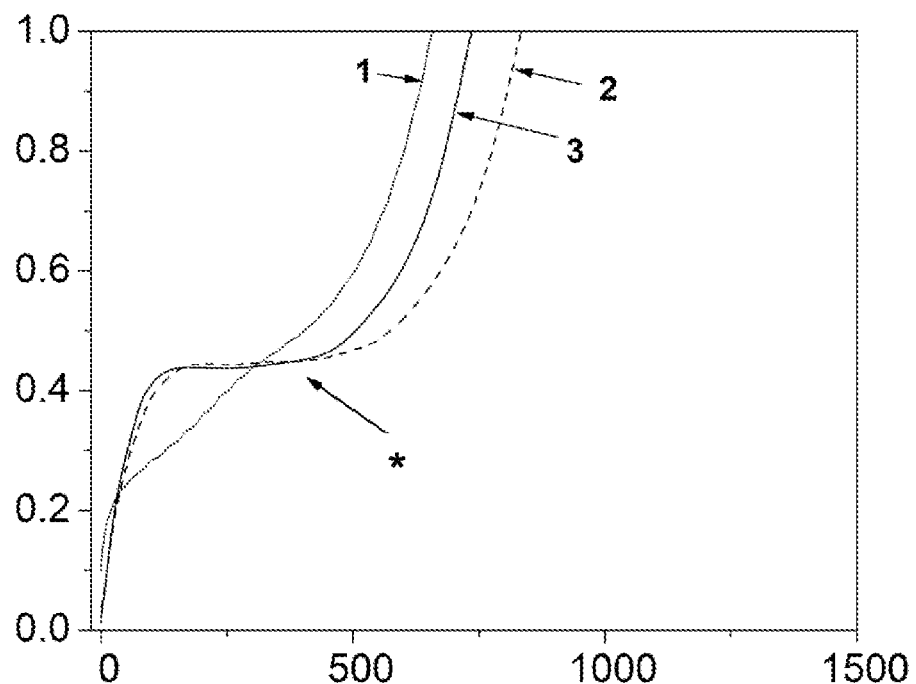
FIG. 2 shows the result of an electrochemical cell study for the silicon powder according to comparative Example 5.
Figure 3:
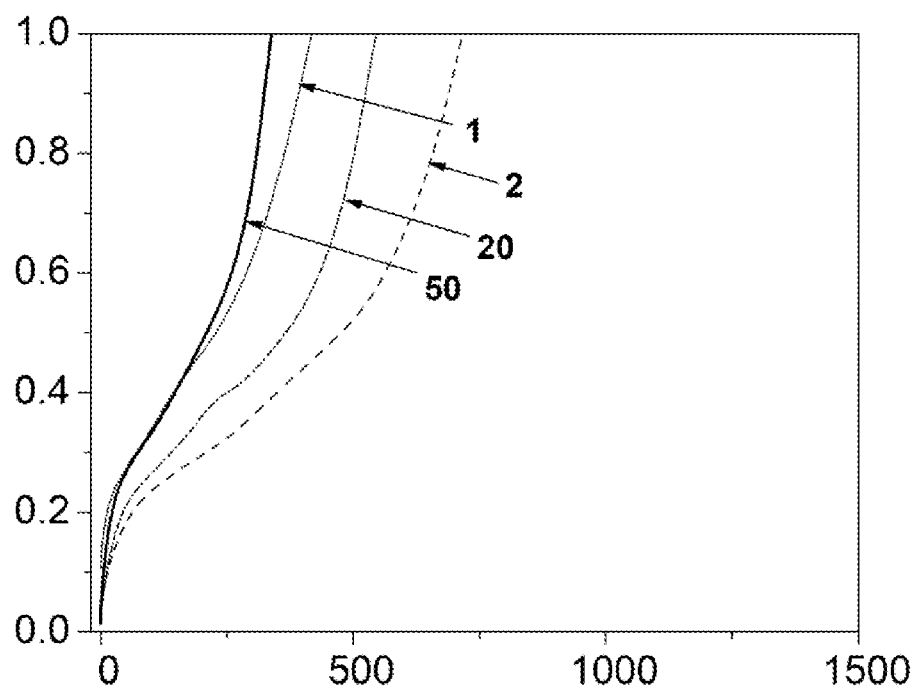
FIG. 3 shows the result of an electrochemical cell study for the inventive silicon-carbon composite powder.

An electrode slurry containing silicon powder prepared according to the comparative Example 5, an aqueous solution of styrol-butadiene-rubber and carbon nanotubes was prepared in a ball mill and subsequently coated onto a copper foil and dried. Discs were punched from the powder coatings and incorporated into coin cells with Li metal counter electrodes and 1 M $LiPF_6$ in ethylene carbonate/dimethyl carbonate electrolyte. FIG. 2 (x-axis=capacity (mAh/g); y-axis=voltage (V)) shows the result of an electrochemical cell study for the silicon powder according to comparative Example 5. A characteristic voltage plateau forming as a result of the dilithiation of the $Li_xSi$ (x≥3.75) phase is present. In contrast, in electrodes containing silicon-carbon composite powders prepared according to Example 1-4, the formation of the detrimental for the electrode stability phase, $Li_xSi$ (x≥3.75), is effectively suppressed, as confirmed by the absence of the characteristic voltage plateau in FIG. 3. In FIGS. 2 and 3 the numbers 1, 2, 3, 20, 50 represent the $1^{st}$, $2^{nd}$ . . . loading cycle. "*" in FIG. 2 represents the plateau connected to the dilithiation of the $Li_xSi$ (x≥3.75) compounds.

Example 6 (comparison): Further embodiment is carried out using the conditions described in Example 1. In contrast to Example 1, acetylene is introduced into the quartz tube reactor as carbon precursor gas $CH_x$ and the ratio of $CH_x/SiH_4$ is 1. The predominant reaction product of comparative Example 6 is amorphous SiC with just a small fraction of mostly crystalline Si, which is undesirable. According to the EDX analysis in TEM there is no significant difference in the C/Si ratio (cf.Table): the ratio by weight of $(C/Si)_{surface}$ on the surface of a particle and the ratio by weight of $(C/Si)_{total}$ within the total particle is 1.3. The amorphous halo in the XRD pattern for the material of comparative Example 6 (C) is shifted to higher diffraction angles indicative of the formation of the amorphous SiC. This type of material is less favorable for battery applications.

TABLE

Process gas parameters and powder properties for Examples 1-6

| Example | $CH_x$* | $SiH_4$ (vol. %) | $CH_x/SiH_4$ | $(C/Si)_{total}$ | $(C/Si)_{surface}$ | $(C/Si)_{surface}/(C/Si)_{total}$ |
|---|---|---|---|---|---|---|
| 1 | Ethylene | 20 | 0.16 | 1.0 | 3.5 | 3.5 |
| 2 | Ethane | 20 | 0.16 | 0.7 | 16.8 | 25 |
| 3 | Propane | 20 | 0.15 | 0.4 | 49.0 | 125 |
| 4 | Acetylene | 20 | 0.14 | 0.3 | 9.0 | 32 |
| 5 | — | 20 | 0 | 0 | 0 | 0 |
| 6 | Acetylene | 10 | 1 | 1.3 | 1.3 | 1 |

* carbon precursor gas

Numerous modification and variations on the present invention are possible in light of above teachings. It is therefore to be understood that within the scope of the appended claims, the invention may be practiced otherwise than as specifically described therein.

The invention claimed is:

1. A silicon-carbon composite powder, wherein, for each silicon-carbon composite particle contained in the powder,
   a) Si and C are distributed throughout the particle and
   b) a weight ratio of carbon to silicon on the particle surface $(C/Si)_{surface}$ is greater than a weight ratio of carbon to silicon within the total particle $(C/Si)_{total}$, wherein
   $10 \leq (C/Si)_{surface}/(C/Si)_{total} \leq 50$, and
   $0.3 \leq (C/Si)_{total} \leq 1$, wherein the silicon-carbon composite powder has an average diameter of 300 nm or less, and the silicon-carbon composite powder does not exhibit a core shell structure.

2. The silicon-carbon composite powder according to claim 1 wherein Si and C are amorphous.

3. The silicon-carbon composite powder according to claim 1, obtained by a process comprising:
   simultaneously feeding a first gaseous stream of $SiH_4$, $Si_2H_6$, $Si_3H_8$ and/or an organosilane and a second gaseous stream of at least one hydrocarbon selected from the group consisting of ethylene, ethane, propane and acetylene into a reactor, and
   reacting the first and second gaseous streams in the reactor using plasma enhanced chemical vapor deposition.

4. The silicon-carbon composite powder according to claim 3, wherein
   the first gaseous stream is a stream of $SiH_4$ and/or an organosilane,
   a ratio of the at least one hydrocarbon to $SiH_4$ and/or the organosilane is 0.01-3, and
   the at least one hydrocarbon is selected from the group consisting of ethylene, ethane and propane.

5. The silicon-carbon composite powder according to claim 4, wherein the first gaseous stream is a stream of at least one organosilane selected from the group consisting of $CH_3SiH_3$, $(CH_3)_2SiH_2$ and $(CH_3)_3SiH$.

6. A process for manufacturing the silicon-carbon composite powder according to claim 1, the process comprising:

simultaneously feeding a first gaseous stream of $SiH_4$, $Si_2H_6$, $Si_3H_8$ and/or an organosilane and a second gaseous stream of at least one hydrocarbon selected from the group consisting of ethylene, ethane, propane and acetylene into a reactor, and reacting the first and second gaseous streams in the reactor using plasma enhanced chemical vapor deposition.

7. The process according to claim 6, wherein the first gaseous stream is a stream of $SiH_4$ and/or organosilane, and a ratio of the at least one hydrocarbon to $SiH_4$ and/or the organosilane is 0.01-3.

8. The process according to claim 6, wherein the at least one hydrocarbon is selected from the group consisting of ethylene, ethane and propane.

9. The process according to claim 6, wherein the first gaseous stream is a stream of at least one organosilane selected from the group consisting of $CH_3SiH_3$, $(CH_3)_2SiH_2$ and $(CH_3)_3SiH$.

10. A method for manufacturing a lithium ion battery, the method comprising:

introducing the silicon-carbon composite powder according to claim 1 into the lithium ion battery.

* * * * *

UNITED STATES PATENT AND TRADEMARK OFFICE
CERTIFICATE OF CORRECTION

| | |
|---|---|
| PATENT NO. | : 11,312,633 B2 |
| APPLICATION NO. | : 16/032683 |
| DATED | : April 26, 2022 |
| INVENTOR(S) | : Lyubina |

It is certified that error appears in the above-identified patent and that said Letters Patent is hereby corrected as shown below:

In the Specification

In Column 5, Line 52, delete "dilithiation" and insert -- delithiation --, therefor.

In Column 5, Line 60, delete "dilithiation" and insert -- delithiation --, therefor.

In the Claims

In Column 6, Claim 3, Lines 47-48, delete "gas sous" and insert -- gaseous --, therefor.

Signed and Sealed this
Fifteenth Day of November, 2022

Katherine Kelly Vidal
*Director of the United States Patent and Trademark Office*